(12) United States Patent
Ocelic

(10) Patent No.: US 8,832,861 B2
(45) Date of Patent: Sep. 9, 2014

(54) NEAR FIELD OPTICAL MICROSCOPE

(75) Inventor: Nenad Ocelic, Martinsried (DE)

(73) Assignee: Neaspec GmbH, Martinsried (DE)

(*) Notice: Subject to any disclaimer, the term of this patent is extended or adjusted under 35 U.S.C. 154(b) by 33 days.

(21) Appl. No.: 13/259,484

(22) PCT Filed: Mar. 12, 2010

(86) PCT No.: PCT/EP2010/053206
§ 371 (c)(1),
(2), (4) Date: Sep. 23, 2011

(87) PCT Pub. No.: WO2010/108796
PCT Pub. Date: Sep. 30, 2010

(65) Prior Publication Data
US 2012/0005793 A1   Jan. 5, 2012

(30) Foreign Application Priority Data

Mar. 23, 2009  (EP) .................................. 09004136

(51) Int. Cl.
*G01Q 60/06* (2010.01)
*G01Q 60/22* (2010.01)
*B82Y 35/00* (2011.01)
*B82Y 20/00* (2011.01)

(52) U.S. Cl.
CPC ............... *G01Q 60/22* (2013.01); *B82Y 35/00* (2013.01); *B82Y 20/00* (2013.01); *Y10S 977/826* (2013.01)
USPC .......................................... 850/30; 977/826

(58) Field of Classification Search
CPC ....... G01Q 60/06; G01Q 60/18; G01Q 60/22; Y10S 977/862
USPC ....................................... 850/32, 30; 977/862
See application file for complete search history.

(56) References Cited

U.S. PATENT DOCUMENTS

| 4,742,522 A * | 5/1988 | Linford ............................. 372/2 |
| 5,739,955 A * | 4/1998 | Marshall ....................... 359/631 |
| 6,545,276 B1 * | 4/2003 | Sasaki ............................ 850/30 |
| 2002/0056807 A1* | 5/2002 | Narita et al. .................. 250/234 |
| 2006/0131493 A1* | 6/2006 | Narita et al. .................. 250/234 |
| 2007/0057211 A1* | 3/2007 | Bahlman et al. .............. 250/584 |
| 2007/0133086 A1* | 6/2007 | Wilhelm et al. .............. 359/385 |
| 2007/0183060 A1* | 8/2007 | Keilmann et al. ............. 359/725 |
| 2008/0007729 A1* | 1/2008 | Hagler ........................... 356/310 |

FOREIGN PATENT DOCUMENTS

| DE | 10 2006 002461 | 7/2007 |
| EP | 1 205 939 | 5/2002 |

OTHER PUBLICATIONS

C. Debus et al., "Probing Highly Confined Optical Fields in the Focus of a High NA Parabolic Mirror with Subwavelength Spatial Resolution," Journal of Microscopy, vol. 210 (1), pp. 203-208 (2003).

* cited by examiner

*Primary Examiner* — Jack Berman
*Assistant Examiner* — Kevin Chung
(74) *Attorney, Agent, or Firm* — Chalin A. Smith; Smith Patent

(57) ABSTRACT

The invention relates to a device for conducting near-field optical measurements of a specimen, a method for conducting near-field optical measurements and the use of the device.

13 Claims, 4 Drawing Sheets

NEAR FIELD OPTICAL MICROSCOPE

The invention relates to a device for conducting near-field optical measurements of a specimen, a method for conducting near-field optical measurements and the use of the device.

Optical near-field microscopy is based upon the measurement of scattered light at a near-field probe which is generated by optical near-field interaction between the near-field probe and a specimen. To achieve high local resolution known near-field probe tips are used, e.g. such tips as used in atomic force microscopy. The near-field probe is illuminated by focused light to generate scattered light. Focusing should be as free from chromatic errors as possible in order to avoid errors in measurement when different wavelengths of the illuminated light are used, e.g. in the visible or mid-infrared spectrum. Hitherto, transmitting optical components have been used for focusing in near-field microscopy, e.g. optical lenses, by means of which the requisite suppression of chromatic errors due to material dispersion in the components cannot be achieved, or can only be achieved to an insufficient extent.

To avoid chromatic errors caused by material dispersion, T. Nakano et al. proposed focusing the illuminating radiation with reflective optical components, e.g. rotation-symmetrical concave mirrors ("Optik", Vol. 94, 1993, pp. 159-162). A reflector in the shape of a paraboloid, for example, was used as a concave mirror, where the paraboloid axis was perpendicular to the surface of the specimen under examination. This geometry produces irradiation of the near-field probe more or less perpendicular to the specimen's surface, as is usual with glass lenses in light-optical microscopy. A disadvantage of conventional reflectors is that the direction of polarization of the illuminating radiation is more or less transverse, whereas a light field oriented perpendicularly to the specimen is preferred for the effect of optical near-field interaction with the specimen. When the conventional concave mirror is inclined, i.e. its axis is not perpendicular to the specimen's surface, further disadvantages arise from the space required by the near-field probe and the effort necessary to achieve a coma-free adjustment.

DE 10 2006 002 461 A1 and US 20070183060, which are incorporated by reference herein, disclose a mirror optic with a reflector in the shape of a paraboloid, the edge of which is shaped so that at least two illumination beam paths can be directed onto the near-field probe. The (reflecting) surface of the reflector is partly cut-out so that at least two unobstructed light paths may be formed. By provision of at least one edge cut-out of the reflector the location of a near-field probe at the focal point of the reflector is facilitated such that, firstly, the illumination beam paths are not obstructed by the mounting of the near-field probe, and secondly, operation of the near-field sensor is not restricted by the operation (movement and oscillation) of the near-field probe. However, these documents only describe one optical pathway, which passes the parabolic reflector to focus on the probe. In particular the reflector 11 is cut so that a first illumination beam path I and a second illumination beam path II can be directed on to the focal point 13, whereby only the first illumination beam path I (cf FIG. 1) strikes the reflector 11 in parallel to the paraboloid axis 12 (x direction) and therefore focuses on the focal point 13 in accordance with the parabolic reflector shape. The scattered light radiated to all sides by the near-field probe at the focal point 13 is partly collected by the reflector 11 and sent as a collimated light beam I in the x direction. The second illumination beam path II extends perpendicularly to the paraboloid axis 12 and to the plane 18. The second illumination beam path II may only be directed on to the focal point 13 from above as shown in FIG. 1, from below the specimen (not shown) or from both sides. The second illumination beam path II creates an optical path along which the specimen and/or the near-field probe can be observed.

To fully use the capabilities of scanning near field optical microscopes it has recently become desirable to be able to use light of several wavelengths simultaneously or sequentially, for illuminating the probe and taking the near-field measurement, which provides more data of the sample. To be able to apply light of several different wavelengths it has been suggested in prior art to first combine the beams of the different light sources, which combined beams are then focused on the probe using the same optical path. For example, DE 10 2006 002 461 A1 and US 20070183060 disclose that a light source device which can produce illuminating beams of several different wavelengths for measurements with spectral resolution can be used. For this purpose, several laser sources with different emission wavelengths may be provided in the light source device. The illuminating beams on the different wavelengths are focused on the near-field probe at the focal point of the near-field probe in parallel to each other, i.e. overlapping beams, on the first illumination beam path I.

Means are known in prior art to combine two laser beams onto one optical path, e.g., by applying coupling mirrors. These mirrors, however, have several drawbacks, e.g., that only light of particular wavelengths can be combined as these mirrors are only available for few wavelengths, and they are expensive.

Another issue when one tries to focus light onto the probe is that the angular space around the probe accessible for the light path is limited by the holder of the probe and by the holder for optical elements needed for illuminating the probe and for detection of the probes deflection, for the case that cantilevered tips are used. Additionally it is desirable to have a rather high numerical aperture for the optical device which focuses the light used for near-field interaction onto the probe in order to obtain both a good focusing and high intensities and therefore an acceptable signal to noise ratio. Thus the optical devices used for focusing and collecting also cover a significant part of the space around the probe.

The objective of the invention is therefore to provide an improved device for the near-field optical measurement of a specimen which does not show the above mentioned problems of the prior art, in particular, to provide a device which allows a near-field optical measurement of a specimen at several different wavelength of illumination light without being limited to particular wavelengths while providing high numerical apertures of the focusing in respect to the probe and while being able to collect as much of the light emitted by the probe as possible.

The present invention relates to a device for the near-field optical measurement of a specimen comprising a probe, a primary mirror, which is a concave mirror, and one or more secondary mirror(s), wherein each one of the secondary mirrors is located in an independent optical pathway, whereby each one independent optical pathway starts at the probe and passes the primary mirror and the secondary mirror, each one of the secondary mirrors is the first mirror located in the respective independent optical pathway downwards the primary mirror, whereby the optical pathways start at the probe and pass the primary mirror, and at least one of the secondary mirrors is arranged such that the distance of the edge of the secondary mirror to the probe is less or equal to about half the focal distance of the primary mirror.

In this embodiment of the device of the present invention at least one of the secondary mirrors, preferably two or more, more preferably all, is (are) arranged in close distance from the probe, more precisely, its edge is not farther away from the probe than about half the focal distance of the primary mirror, preferably one quarter of the focal distance of the primary mirror, most preferably less. This ensures that light scattered from the tip even at small angles in respect to the paraboloid axis of the primary mirror is intercepted and reflected by the secondary mirror(s). Preferably the probe is in the focus of the primary mirror, therefore preferably the edge of at least one secondary mirror is not farther away from the point of focus of the primary mirror than about half the focal distance of the primary mirror, more preferably one quarter of the focal distance or the primary mirror, most preferably less. Preferably the edge of the secondary mirror is the edge of the reflective area of the secondary mirror. The distance of the probe to the edge of the secondary mirror is the shortest distance of the edge of the secondary mirror to the probe, in particular to the tip of the probe.

In a preferred embodiment this device comprises at least two secondary mirrors, and the secondary mirrors are arranged such that the parts of different independent optical pathways which are located downwards the secondary mirrors are not parallel to each other, whereby the independent optical pathways start at the probe and pass the primary mirror and the respective secondary mirror.

The present invention further relates to a device for the near-field optical measurement of a specimen comprising
a probe,
a primary mirror, which is a concave mirror,
and at least two secondary mirror(s),
wherein each one of the secondary mirrors is located in an independent optical pathway, whereby each one independent optical pathway starts at the probe and passes the primary mirror and the secondary mirror,
each one of the secondary mirrors is the first mirror located in the respective independent optical pathway downwards the primary mirror, whereby the optical pathways start at the probe and pass the primary mirror,
and the secondary mirrors are arranged such that the parts of different independent optical pathways which are located downwards the secondary mirrors are not parallel to each other, whereby the independent optical pathways start at the probe and pass the primary mirror and the respective secondary mirror.

Thus in this embodiment each of the independent optical pathways due to each secondary mirror results in an outgoing beam with different direction.

Probes to be used in the devices according to the present invention are known in the art. Suitable probes are known tips for SNOM, which can be metallized, in particular, cantilevered tips are preferred, such as used in atomic force microscopy. However also sharpened glass fibers or similar sharpened tips may be applied. SNOM tips are commercially available.

The primary mirror to be used in the device according to the present invention is a concave mirror. The shape of the concave, reflective area of the mirror is such that the light of independent optical pathways can be focused on the probe, in particular the tip of the probe. Therefore the primary mirror is preferably arranged such that the concave side of the mirror faces the probe and the light of at least two optical pathways can be focused on the probe, in particular the tip of the probe. Thus the probe, in particular the tip of the probe, is preferably positioned in the point of focus of the concave primary mirror.

In a preferred embodiment the primary mirror of the device of the present invention is a parabolic mirror, in particular a parabolic mirror as disclosed in DE 10 2006 002 461 A1 as also described in detail below. By using a parabolic mirror as primary mirror both the disadvantages of conventional concave mirrors, such as those discussed in DE 10 2006 002 461 A1, are overcome, and the location of the near-field probe in the focal point of the mirror and illumination thereof is possible. Further several independent optical pathways which focus on the probe can be easily obtained.

Preferably a parabolic mirror, i.e. a reflector in the shape of a paraboloid, is used as primary mirror, more preferably the edge of which is shaped so that several optical pathways are present which can be directed onto one focal point of the primary mirror. The (reflecting) surface of the primary mirror is preferably partially cut out so that at least two unobstructed optical pathways may be formed which extend through the focal point of the primary mirror. The provision of at least one edge cut-out of the reflector advantageously facilitates the location of a near-field probe at the focal point of the primary mirror, so that, firstly, the optical pathways are not obstructed by the mounting of the near-field probe and secondly operation of the near-field sensor is not restricted by the operation (movement and oscillation) of the near-field probe. A mirror in the form of a paraboloid, the edge of which forms a circular arc in a plane perpendicular to the paraboloid axis, is not absolutely necessary for fault-free focusing along a optical pathway for excitation and observation of scattered light at the near-field detector. In accordance with the invention, even a paraboloid with at least one cut-out, which also provides optical access along an optical pathway for observing the specimen and/or the near-field probe, facilitates effective light collection at the near-field probe. The cut reflector surface facilitates both the focusing of collimated first illuminating radiation on the near-field probe to generate scattered light and the focusing of second illuminating radiation for observation of the specimen and/or the near-field probe.

The shape of the preferred primary mirror used represents part of a paraboloid. The term "paraboloid" is used here to define any geometrical area with an axis (paraboloid axis) of which a section parallel to the paraboloid axis produces a parabola. A section perpendicular to the paraboloid axis produces a circle. The paraboloid is a paraboloid of revolution. The intersection between the paraboloid axis and the paraboloid is called as the origin of the paraboloid. The preferred primary mirror in the form of a paraboloid has a first edge which restricts the paraboloid surface in one direction parallel to the paraboloid axis. The first edge is also defined herein as the principal aperture of the paraboloid. The principal aperture typically extends in a plane perpendicular to the paraboloid axis.

If, in accordance with a modified embodiment of the invention, the primary mirror in the form of a paraboloid is provided for an oblique alignment relative to the surface of the specimen, the principal aperture can also extend in a plane which forms an angle with the paraboloid axis which is not equal to 90°.

The primary mirror more preferably has a second edge which is formed by the provision of a cut-out for the optical path used for detection of the probes deflection, for the case a cantilevered probe is used. The second edge is also called herein the side aperture of the paraboloid. In general, the side aperture is formed by a section of the paraboloid, the plane of which section does not extend through the apex of the paraboloid and which is not perpendicular to the paraboloid axis. The cut-out is typically formed by a section plane of the paraboloid which extends in parallel to the paraboloid axis at a distance from it. The preferable distance is 1/10th to 2 times the focal length of the primary mirror, more preferable 1/10$^{th}$ to one time the focal length of the primary mirror. The section plane may be inclined in relation to the paraboloid axis, particularly when used with a reflector in an oblique position.

In accordance with a more preferred embodiment of the invention, the primary mirror used in the device according to the present invention forms a semi-paraboloid. In this case, the primary mirror has an additional third edge which restricts the paraboloid form in or in the vicinity of a mid-plane of the paraboloid. The third edge is also called "the base aperture" of the paraboloid. In this case, the term "semi-paraboloid" means both precise halving and also the case of a paraboloid additionally cut out at the base aperture. The primary mirror can thus advantageously be located relative to a plane surface of a specimen to be examined so that the paraboloid axis extends in parallel to or into the surface of the specimen. In this embodiment of the invention the independent optical pathways are advantageously aligned in parallel to the surface of the specimen. Polarization of the independent optical pathways can be aligned so that light with polarization more or less perpendicular to the surface of the specimen is provided at the near-field probe, which alignment is advantageous due to an increased antenna function of the probe.

Preferably cone angles in relation to the focal point of the primary mirror in the form of a paraboloid are spanned by the edges of the parabolic primary mirror, leaving angular space for the near-field probe and the independent optical pathways, and optionally the optical pathways for measuring the deflection of the probe, for the case that cantilevered probes are used. In accordance with a preferred embodiment of the device according to the invention, the cone angle $\alpha$ (illustrated in FIG. 2) of the reflector formed in a mid-plane between the second and the third edge is set in a range of about 20° to about 70°, preferably about 50° to about 70°. The inventors have found that thereby a highly-effective illumination of the focal point by the independent optical pathways is possible for angles in this range without cutting the optical pathway too strongly for determination of the deflection of the probe, for the case a cantilevered probe is used.

The first edge of the paraboloid forms the principal aperture with a predetermined cone angle $\beta$ (illustrated in FIG. 3). The cone angle $\beta$ represents the angle in which the light reaches the focal point on the independent optical pathways. If the cone angle $\beta$ is in the preferred range between about 30° to about 240°, more preferable in the range of about 60° to about 240°, the collection of light at the focal point of the primary mirror can be improved advantageously.

A major advantage of the primary mirror as preferably used as described above is that several operating conditions of near-field microscopy can be fulfilled simultaneously, comprising the movement of the specimen in relation to the near-field probe and primary mirror, the near-field probe mounting, the reversibility of the independent optical pathways for reading the scattered light and optical access to the microscopic observation of the near-field probe and/or reading deflection of the near-field probe, for the case a cantilevered tip is used. Moreover, the light can be polarized so that the field strength contains a strong component along the near-field probe perpendicular to the surface of the specimen, which is a particular advantage due to the antenna function of metallic probe tips in scattering-type scanning near-field microscopy (s-SNOM).

If the primary mirror is provided with an adjustment element, in accordance with a further preferred embodiment of the invention, advantages may emerge for an adjustment of the independent optical pathways, in particular in relation to the paraboloid axis of the primary mirror, if the preferred parabolic primary mirror is used. The adjustment element is an optical component with a substantially plane reflector, the surface of which is located perpendicularly to the optical axis of the primary mirror, e.g. the parabolic axis for the case the preferred parabolic mirror is used as primary mirror. A plane mirror or another reflective component with a flat surface may, for example, be used as the adjustment element.

The adjustment element is preferably located at one edge of the primary mirror, to preclude interference with the independent optical pathways or the optical pathway for determination of the deflection of the tip, for the case a cantilevered tip is used. Location on the second edge, i.e. on the periphery of the reflector cut-out, is particularly preferable.

If the illumination intensity at the position of the adjustment element is insufficient for reliable adjustment, the primary mirror of the device according to the present invention can be provided with a deflector element. The deflector element is typically located in the opening paraboloid in the independent optical pathways and diverts part of the illuminating radiation from one or more of the independent optical pathways to the adjustment element. The deflector element is preferably a plane, parallel, transparent plate, e.g. glass. The edge of the primary mirror is advantageously illuminated with the aid of the deflector element.

The primary mirror in the device according to the present invention is preferably arranged in relation to a specimen so that the paraboloid axis of the primary mirror extends parallel to the surface of the specimen. Alternatively, the paraboloid axis may be inclined in relation to the surface of the specimen at a reflector angle which is, for example, set in the range above about 0° to about 60°, preferably about 10° to about 45°, whereby in this case advantages may emerge for the adjustment or setting of a certain polarization of the first illumination beam path in relation to the alignment of the surface of the specimen. In particular, the independent optical pathways can thus be directed across the probe tip and its mounting, facilitating an even more compact structure. In order to obtain an optimal (high) collection of light by the primary mirror according to this embodiment, the first edge preferably does not extend through a plane perpendicular to the paraboloid axis, but through a plane perpendicular to the surface of the specimen. The angle between the plane spanned by the first edge and a normal on the paraboloid axis corresponds to the reflector angle. In addition, the second edge preferably does not extend through a plane parallel to the paraboloid axis, but parallel to the surface of the specimen. The angle between the plane spanned by the second edge and the paraboloid axis then also corresponds to the reflector angle.

The primary mirror in the device of the present invention may be constructed by several parts, which together form the primary mirror. In this embodiment manufacture of the parts may be simplified, especially for very high cone angles. Preferably the primary mirror is build from one piece in order to avoid disadvantages which may arise due to the junction lines between different parts.

The device according to the present invention further comprises one or more secondary mirrors, preferably two or more, most preferable two. Each one of the secondary mirrors is located, i.e. mounted, in an independent optical pathway. The term 'optical pathway', or 'optical (beam) path', as used herein is the path that light takes in traversing the optical system. An 'independent optical pathway' as used herein is the optical path which starts at the probe and passes the primary mirror and the secondary mirror, in this order. For the case of illumination of the probe the light follows these independent optical pathways, and passes the mirrors, in reversed order as defined above. The light which is emitted by the probe follows the independent optical pathway and passes the mirrors, i.e. is reflected at the mirrors, in the order as defined above.

Thus the term 'independent optical pathway which starts at the probe and passes' one or more mirrors as used herein means the path that light, emitted from the probe, takes, the direction of the path being defined by the direction of the light emitted by the probe. Thus a position 'downwards' on this path means that the light emitted by the probe passes this position later, and a position 'upwards' on this path means that the light emitted by the probe passes this position earlier.

Each one of the secondary mirrors is located in an independent optical pathway in the device according to the present invention. Two independent optical pathways are herein termed as 'independent' if these optical paths are not superimposed, preferably the independent optical pathways are not parallel and do not overlap, except at the probe. Thus two independent optical pathways are e.g. two different optical paths for the light to take to the probe, or from the probe, respectively.

In one embodiment of the device of the present invention at least one of the secondary mirrors is arranged such that the distance of the edge of the secondary mirror to the probe is less or equal to about half the focal distance of the primary mirror, preferably equal or less than $1/10$ of the focal distance of the primary mirror.

The secondary mirror in the device according to the present invention is the first mirror on each independent optical pathway the light is reflected at after being emitted from the probe and after being reflected at the primary mirror. For the case two or more secondary mirrors are present, these secondary mirrors are preferably arranged such that the parts of different independent optical pathways which are located downwards the secondary mirrors are not parallel to each other. Thus e.g. two optical pathways start at the probe in different orientations, are then reflected at the primary mirror and are, e.g. in the case of a parabolic mirror, then parallel to each other, but not overlapping, and are finally reflected at two different secondary mirrors into two different orientations, thus they are not parallel any more. The term parallel as used herein means "parallel and the same direction", which correspond to an angle of 0°. Parallel pathways with opposing direction are antiparallel, what means angle of 180°. More preferably the parts of different independent optical pathways which are located downwards the secondary mirrors, form an angle of about 20° to about 180°, preferably about 90° to about 180°, in particular about 100° to about 160°, such as about 120°. This angle in defined as the angle between the two corresponding straight lines which run in the center of two parts of different independent optical pathways which are located downwards the secondary mirrors. The straight lines have the direction downwards the optical pathway. For the case that these straight lines intersect, the angle is the angle between the two straight lines in downward direction of the pathways; for the case that these straight lines are skew, the angle is the corresponding angle between two intersecting auxiliary straight lines which are parallel to the straight lines running in the center of the parts of different independent optical pathways which are located downwards the secondary mirrors. The optical (beam) pathway is preferably defined as the collection of (all) rays that are scattered starting from the probe and reflected first by the primary and then by the same secondary mirror, respectively, thus most preferably by each secondary mirror present in the device an independent optical pathway is formed. The outgoing beams do generally not have to have a circular or highly symmetric cross sections.

In one preferred embodiment two independent optical pathways are reflected on the primary mirror at different areas of the primary mirror, i.e. the reflective area on the primary mirror used to reflect one independent optical pathway is not used to reflect any other independent optical pathway. More preferably two independent optical pathways do not overlap except at the probe, i.e. the independent optical pathways do not intersect, except at the probe. Intersection of the independent optical pathways at the probe is necessary, as all independent optical pathways are focused on the probe, in particular on the tip of the probe, via the primary mirror.

In a preferred embodiment of the device according to the present invention at least one of the secondary mirrors is a substantially planar mirror, more preferably all secondary mirrors are substantially planar mirrors.

In a further preferred embodiment of the device according to the present invention the primary mirror is a parabolic mirror, e.g. the parabolic mirror as described above. More preferably the primary mirror is a parabolic mirror, e.g. the parabolic mirror as described above, and all secondary mirrors are planar mirrors. A particularly preferred parabolic mirror to be used as primary mirror is the mirror as disclosed in DE 10 2006 002 461 A1.

By the combination in the device of the invention of one primary mirror, which is preferably parabolic, and at least two secondary mirrors, which reflect the optical pathways into two different directions, at least two independent optical pathways are provided. These independent optical pathways can advantageously be used to illuminate the probe with light of at least two different wavelengths without being limited to any specific wavelength, as one separate optical pathway can be used for each wavelength. These independent optical pathways can also be used to collect the light emitted by the probe, in particular the tip of the probe. Optionally a further independent optical pathway can be used to collect the light emitted by the probe without being disturbed by illuminating light. Further this combination in the device of the invention of one primary mirror, which is preferably parabolic, and at least two secondary mirrors as described above thus enables the focusing of at least two independent optical pathways on the probe, while at the same time it is still possible to detect the deflection of the probe, for the case a cantilevered probe is used, although the space around the probe is rather crowded. If further at least one of the secondary mirrors is arranged such that the distance of the edge of the secondary mirror to the probe is less or equal to about half the focal distance of the primary mirror, an additionally advantageous collection of the light emitted by the probe is achieved, as also the light reflected on the primary mirror close to its apex can be reflected by the secondary mirror. Otherwise this light would hit the probe or the holder of the probe and could not be used for detection.

Additionally the use of one single primary mirror ensures a large angular space for focusing on the probe by filling nearly half the space around the probe is available. In optics, the numerical aperture (NA) of an optical system is a dimensionless number that characterizes the range of angles over which the system can accept or emit light. NA is defined by $n*\sin(\theta)$, wherein $\theta$ is the half-angle of the maximum cone of light that can enter or exit the lens. Thus a corresponding NA can be determined, wherein n=1 for air, which corresponds to the $\sin(\theta)$, wherein $\theta$ is the half-angle of the maximum cone of light spanned by the primary mirror. Preferably the primary mirror of the device of the present invention has a numerical aperture NA in the range of about 0.2 to about 1, most preferably at least 0.5 up to about 1. These high numerical apertures of the system can only be obtained due to the usage of one primary mirror, combined with the secondary mirror(s) to provide independent optical pathway(s), whereby it is ensured that as much of light emitted by the probe into the angular space spanned by the primary mirror is collected and detected, although there is limited space around the probe.

The secondary mirrors are preferably rather close to the probe and to the primary mirror. Preferable the distance of the centre of the reflective area of the secondary mirrors to the focal point of the primary mirror is less than about four times the focal distance of the primary mirror, more preferably less than about two time the focal distance of the primary mirror. This is to ensure that at least two independent optical pathways are available for the illumination of the probe and/or determination of the light emitted by the probe, which both have a high numerical aperture as defined above. Preferably in this embodiment of the device according to the present invention at least one of the secondary mirrors is arranged such that the distance of the edge of the secondary mirror to the probe is less or equal to about half the focal distance of the primary mirror, preferably equal or less than $1/10$ of the focal distance of the primary mirror.

In a preferred embodiment of the present invention the probe or the probe holder is located, i.e. mounted, substantially between two of the secondary mirrors in the device of the invention. More preferable the secondary mirrors, most preferable, two of them, are arranged substantially symmetrically around the probe, preferable in the plane parallel to the specimen, as indicated in FIG. 4. Preferably in this embodiment of the device according to the present invention at least one of the secondary mirrors, most preferably both secondary mirrors, is (are) arranged such that the distance of the edge of the secondary mirror(s) to the probe is less or equal to about half the focal distance of the primary mirror, preferably equal or less than $1/10$ of the focal distance of the primary mirror. This arrangement ensures excellent stability of the optical pathways in respect to adjustability and vibrations, while keeping the optical pathways short and the numerical apertures as high as possible.

In a particularly preferred embodiment the device according to the present invention contains two secondary mirrors, and therefore also two independent optical pathways as defined above.

The invention relates also to a method for scanning the optical near-field of a specimen, wherein a device as described above is applied.

The invention relates further to the use of a device a described above for scanning the optical near-field of a specimen.

The device of the present invention is preferably provided with at least one light source device by means of which the near-field probe can be illuminated at the focal point of the primary mirror optic via one of the independent optical pathways. The mirror optic, i.e. all the mirrors used comprising the primary mirror and the secondary mirrors, and the light source device are preferably fixed in relation to each other so that adjustments during optical near-field measurement can be avoided. The light source device can advantageously produce illuminating beams of several different wavelengths for measurements with spectral resolution. For this purpose, several laser sources with different emission wavelengths may be provided in the light source device. This may become necessary if illumination is intended using light of more different wavelengths that independent optical pathways are available. The illuminating beams of the different wavelengths produced by one source device can then be focused on the near-field probe at the focal point of the primary mirror on one of the independent optical pathways.

The device according to the present invention is preferably also provided with a detector by which the light scattered by the near-field probe can be detected. The mirror optic used according to the invention advantageously detects a large spatial angle to collect the light scattered at the near-field probe, so that the near-field microscope is distinguished by high collection efficiency and an improved signal-to-noise ratio. The spatial angle covered by the primary mirror corresponds to a large cross-section of optionally parallel beams on the independent optical pathways. As the parallel beams on each independent optical pathway are typically not compact but deformed in the form of a rectangle or elongated, a division of the parallel beam into two or more beams on each independent optical pathway extending adjacently may be provided. Several beams may thus be advantageously directed on to the near-field probe in this way or the light scattered back may thus be detected with spatial resolution.

The figures illustrate further details and advantages of the invention.

Figure 1:
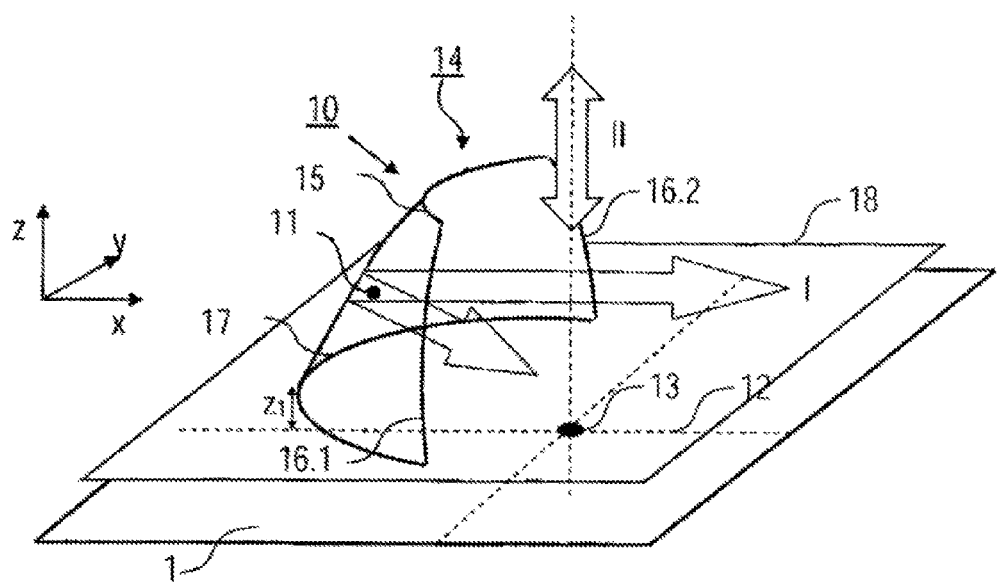
FIG. 1 is a diagrammatic representation of the paraboloid shape of the primary mirror, i.e. a reflector of a mirror optic according to DE 10 2006 002 461 A1.

The invention is further illustrated by the detailed description of the figures:

FIG. 1 illustrates an embodiment of a primary mirror 10, formed by a concave mirror. The reflector 11 is formed on the inner curve of the concave mirror, wherein the surface of the reflector 11 forms a recess of a paraboloid with the focal point 13 on the paraboloid axis 12. In the example illustrated, the paraboloid axis 12 extends in direction x. The paraboloid surface opens in the direction x. The shape of the reflector 11 is determined by the following three sections of the paraboloid. The first section extends in parallel to the y-z plane to form the first (forward) edge 16.1, 16.2 of the reflector 11. The principal aperture of the paraboloid is cut so that the focal point 13 lies outside the space enclosed by the reflector 11. The second and third sections extend in parallel to the x-y plane, forming the upper (second) edge 15 and the lower (third) edge 17. With upper edge 15 the cut-out 14 provided according to the invention takes the form of a side aperture of the paraboloid. The lower edge 17 lies in a plane 18 which is at a predetermined distance $z_1$ from the paraboloid axis 12 containing the focal point 13. The distance $z_1$ is, for example, about 1 mm. The third edge restricts the shape of the semi-paraboloid in the vicinity of the middle plane of the paraboloid. Alternatively, a semi-paraboloid may be created in which the plane 18 coincides with the central plane of the paraboloid. In relation to the focal point 13, the lower edge 17 and the upper edge 15 form the cone angle α and the root points of the forward edges 16.1, 16.2 form the cone angle 13.

The reflector 11 is cut so that a the independent optical pathways (only one path I is indicated) and a optical pathway II for the detection of the deflection of the probe to be used, if cantilevered tips are applied, can be directed on to the focal point 13. The path I as indicated (illustrated diagrammatically) displays the direction of all the optical pathways striking the reflector 11 in parallel to the paraboloid axis 12 (x direction), which are focused on the focal point 13 in accordance with the parabolic reflector shape. The scattered light radiated to all sides by a near-field probe at the focal point 13 is collected in the opposite direction by the reflector 11 and diverted in the x direction.

The optical pathway II extends perpendicularly to the paraboloid axis 12 and to the plane 18. This pathway II may be directed on to the focal point 13 from the reflector side (as shown), from the opposite side, or from both sides. This optical pathway II is typically used to detect the deflection of the probe, for the case cantilever probes are used.

The independent optical pathways (indicated by path I) create several optical paths on which the specimen and/or the near-field probe can be observed. In particular, the surface of the specimen can be detected by a microscope and/or the orientation of the near-field probe can be detected by an optical deflection detector.

Figure 2:
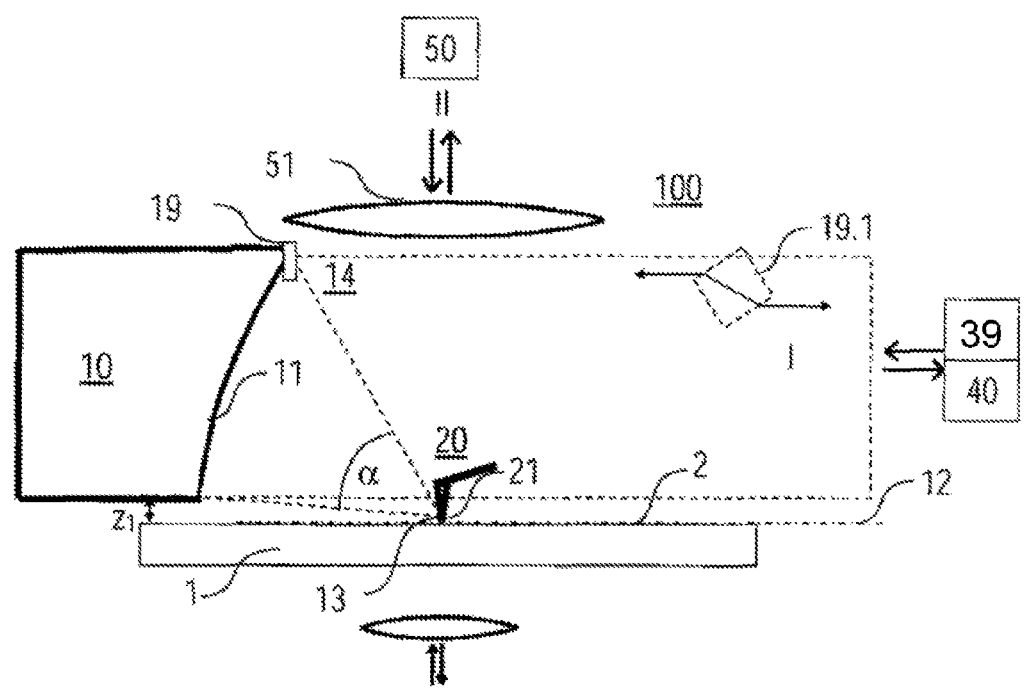
FIGS. 2 and 3 are diagrammatic illustrations (side and top view) of preferable embodiments of parts of the device according to the present invention.
Figure 3:
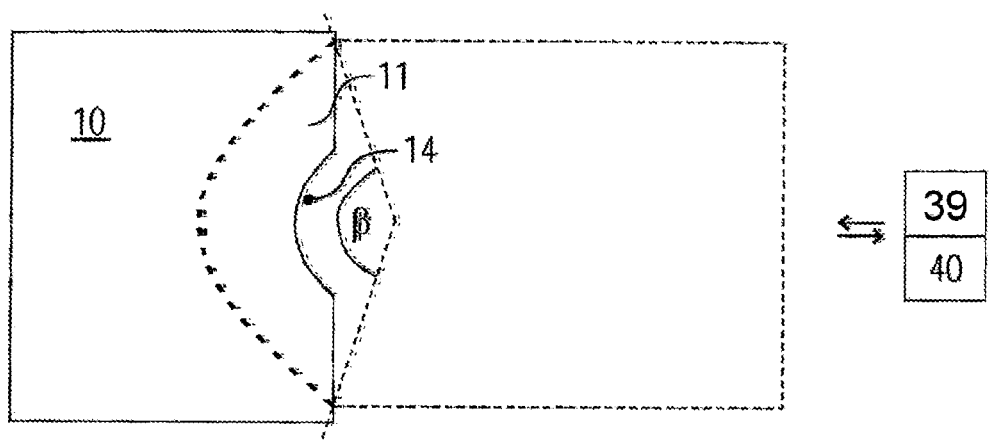

For use in near-field microscopy the reflector 11 may be formed by a metal foil, e.g. made of nickel, or by a coated concave surface of an optical component, as illustrated in FIGS. 2 and 3.

FIGS. 2 and 3 illustrate an embodiment of an optical near-filed microscope 100 with the primary mirror 10, a near-field probe 20, a light source device 39, a detector device 40 and a camera device 50. The diagrammatically illustrated components 20 to 50 (only partially shown in the figure) and a control and analysis device (not shown) of the near-field microscope are constructed in the way known from conventional near-field microscopy.

The primary mirror 10 includes a mirror body with a concave surface, which forms the reflector 11. The surface of the reflector 11 represents a recess in a paraboloid as it has been described above. The mirror body consists, for example, of aluminium.

The primary mirror 10 is e.g. located at distance $z_1$ above the surface 2 of the specimen 1 to be examined. The cone angle α between the lower edge 17 and the upper edge 15 is e.g. 50°. Parallel to the surface 2 of the specimen 1, the cone angle β (see FIG. 3) is e.g. 150°. The paraboloid axis 12 of the reflector 11 extends in parallel to surface 2.

In accordance with a modified embodiment of the invention, the paraboloid axis 12 may be inclined relative to the surface 2 at a reflector angle of e.g. 20°. The first edge 16.1, 16.2 then extends perpendicularly to the surface of the specimen in a plane which correspondingly spans an angle of e.g. 70° with the paraboloid axis. In addition, the second edge 15 also spans e.g. 20° with the paraboloid axis, corresponding to the reflector angle.

The adjustment element 19 is located on the upper (second) edge 15 of the edge recess 14. The adjustment element 19 includes a plane mirror, the surface of which is aligned perpendicularly to the paraboloid axis 12. The radiation directed e.g. along one of the independent optical pathways indicated as the beam path I can be adjusted precisely in parallel to the paraboloid axis 12 with the adjustment element 19. For this purpose it is sufficient for the mirror surface of the adjustment element 19 to have small dimensions of e.g. 1 mm². Should the intensity of radiation on edge 15 be insufficient for the purposes of adjustment, a coplanar transparent plate 19.1 (shown as a dotted line) can be used in one of the independent optical pathways as indicated as beam path I, by which part of the light is diverted on to the adjustment element 19, without having any major effect on irradiation of the probe tip 21.

The light radiated in parallel to paraboloid axis 12 is focused on the probe tip 21 by the reflector 11. Focusing a strong component of the electrical field standing perpendicularly to the surface 2 of the specimen 1 on to the probe tip 21 is advantageously facilitated.

Figure 4:
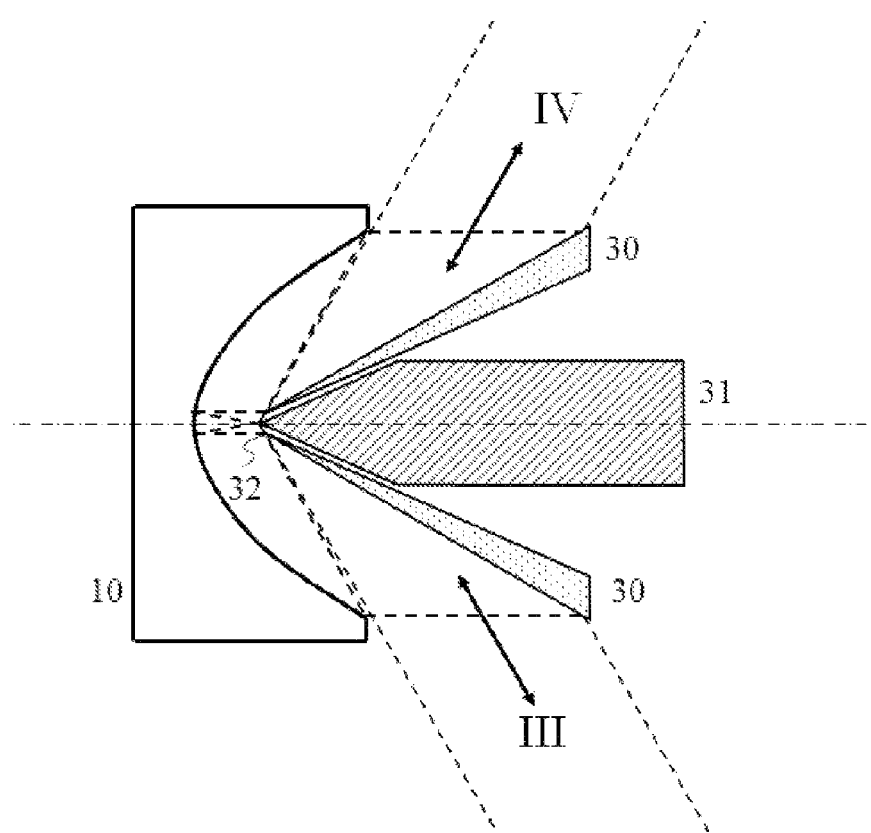
FIG. 4 is a diagrammatic top view of a device of the present invention showing a preferred embodiment of the inventive arrangement of a primary mirror and two secondary mirrors.

As illustrated in FIG. 4, which is a top view, the holder of the probe (31) (probe not shown) is flanked by two secondary mirrors (30) which thereby provide two independent optical pathways III and IV. The parts of the independent optical pathways which are located downwards the secondary mirrors (where the symbols "III" and "IV" are indicated) form an angle of roughly 120°. The edge of the secondary mirror (32) is close to the probe to ensure reflection of the light which is reflected by the primary mirror close to its apex.

The invention claimed is:

1. A device for the near-field optical measurement of a specimen comprising a probe, a primary mirror (10), which is a concave mirror, and at least two secondary mirror(s) (30), wherein each one of the secondary mirrors (30) is located in an independent optical pathway, whereby each one independent optical pathway starts at the probe and passes the primary mirror (10) and the secondary mirror (30), each one of the secondary mirrors (30) is the first mirror located in the respective independent optical pathway downwards the primary mirror (10), whereby the optical pathways start at the probe and pass the primary mirror (10), and the secondary mirrors (30) are arranged such that the parts of different independent optical pathways that are located downwards the secondary mirrors (30) are not parallel to each other, whereby the independent optical pathways start at the probe and pass the primary mirror (10) and the respective secondary mirror (30).

2. A device for the near-field optical measurement of a specimen comprising a probe, a primary mirror (10), which is a concave mirror, and one or more secondary mirror(s) (30), wherein each one of the secondary mirrors (30) is located in an independent optical pathway, whereby each one independent optical pathway starts at the probe and passes the primary mirror (10) and the secondary mirror (30), each one of the secondary mirrors (30) is the first mirror located in the respective independent optical pathway downwards the primary mirror (10), whereby the optical pathways start at the probe and pass the primary mirror (10), and at least one of the secondary mirrors (30) is arranged such that the distance of the edge of the secondary mirror (32) to the probe is less or equal to about half the focal distance of the primary mirror (10).

3. The device according to claim 2, wherein the secondary mirrors (30) are arranged such that the parts of different independent optical pathways that are located downwards of the secondary mirrors (30) are not parallel to each other, whereby the independent optical pathways start at the probe and pass the primary mirror (10) and the respective secondary mirror (30).

4. The device according to claim 1, wherein the at least two independent optical pathways are reflected on the primary mirror (10) at different areas of the primary mirror.

5. The device according to claim 1, wherein the at least two independent optical pathways do not overlap except at the probe.

6. The device according to claim 1, wherein the secondary mirrors (30) are planar mirrors.

7. The device according to claim 1, wherein the primary mirror (10) is a parabolic mirror.

8. The device according to claim 1, wherein the secondary mirrors (30) are arranged such that the parts of the independent optical pathways that are located downwards the secondary mirrors, form an angle of about 20° to about 180°.

9. The device according to claim 1, wherein the probe or a holder of the probe is located substantially between two of the secondary mirrors (30).

10. The device according to claim 1, wherein said device has two secondary mirrors (30).

11. The device according to claim 1, wherein the distance from the centre of the reflective area of the secondary mirror (s) (30) to the focal point of the primary mirror (10) is less than about four times the focal distance of the primary mirror (10).

12. A method for scanning the optical near-field of a specimen, comprising the step of analyzing the specimen using the device according to claim 1.

13. The device according to claim 1, wherein the distance from the centre of the reflective area of the secondary mirror (s) (30) to the focal point of the primary mirror (10) is less than about two times the focal distance of the primary mirror (10).

* * * * *